(12) United States Patent
Payne et al.

(10) Patent No.: US 6,854,342 B2
(45) Date of Patent: Feb. 15, 2005

(54) INCREASED SENSITIVITY FOR TURBINE FLOW METER

(75) Inventors: Edward A. Payne, Greensboro, NC (US); Richard R. Sobota, Kernersville, NC (US); Seifollah S. Nanaji, Greensboro, NC (US); Brent K. Price, Winston-Salem, NC (US)

(73) Assignee: Gilbarco, Inc., Greensboro, NC (US)

( * ) Notice: Subject to any disclaimer, the term of this patent is extended or adjusted under 35 U.S.C. 154(b) by 0 days.

(21) Appl. No.: 10/227,746

(22) Filed: Aug. 26, 2002

(65) Prior Publication Data

US 2004/0035220 A1 Feb. 26, 2004

(51) Int. Cl.[7] .................................................. G01F 1/05
(52) U.S. Cl. ..................................................... 73/861.79
(58) Field of Search .................. 73/861.79, 861.84, 73/861.12, 861.77, 861.89, 861.91, 861.92; 141/59

(56) References Cited

U.S. PATENT DOCUMENTS

| | | | |
|---|---|---|---|
| 2,733,604 A | 2/1956 | Coulter | |
| 3,180,144 A | 4/1965 | Bennett | 73/194 |
| 4,122,524 A * | 10/1978 | McCrory et al. | 705/413 |
| 4,137,767 A | 2/1979 | Wada | 73/194 |
| 4,242,685 A | 12/1980 | Sanford | 343/770 |
| 4,388,834 A | 6/1983 | Schmoock | 73/861.12 |
| 4,418,285 A * | 11/1983 | Podolsky et al. | 290/40 R |
| 4,535,637 A * | 8/1985 | Feller | 73/861.77 |
| 4,672,386 A | 6/1987 | Wood | 343/770 |
| 4,741,215 A | 5/1988 | Bohn et al. | 73/861.12 |
| 4,825,166 A | 4/1989 | MacGugan | 324/346 |
| 4,876,653 A | 10/1989 | McSpadden et al. | 700/139 |
| 4,916,457 A | 4/1990 | Foy et al. | 343/770 |
| 5,244,746 A | 9/1993 | Matsui et al. | 428/609 |
| 5,312,790 A | 5/1994 | Sengupta et al. | 501/137 |

(List continued on next page.)

Primary Examiner—Edward Leftkowitz
Assistant Examiner—Jewel Thompson
(74) Attorney, Agent, or Firm—Withrow & Terranova, PLLC

(57) ABSTRACT

A lower cost turbine flow meter comprised of an inner housing constructed out of a high permeable material surrounded by an outer housing constructed out of a lower cost, lower permeable material. A port is placed in the outer housing that runs down to the surface of the inner housing to detect the rotation of turbine rotors that rotate inside the meter as fluid or gas flows through the meter. A pickoff coil is placed in the port to generate a magnetic signal to penetrate through the inner housing wherein the turbine rotor vanes superimpose a pulse signal on the magnetic signal. The lower cost turbine flow meter can be used for any application for measuring fluid or gas, and may be used in a service station environment for measuring fuel or vapor in vapor recovery applications.

35 Claims, 7 Drawing Sheets

U.S. PATENT DOCUMENTS

| | | | | |
|---|---|---|---|---|
| 5,325,729 A | * | 7/1994 | Goodson et al. | 73/861.91 |
| 5,427,988 A | | 6/1995 | Sengupta et al. | 501/137 |
| 5,464,466 A | | 11/1995 | Nanaji et al. | 94/45 |
| 5,486,491 A | | 1/1996 | Sengupta et al. | 501/137 |
| RE35,238 E | | 5/1996 | Pope | 141/59 |
| 5,581,266 A | | 12/1996 | Peng et al. | 343/770 |
| 5,593,495 A | | 1/1997 | Masuda et al. | 117/4 |
| 5,635,433 A | | 6/1997 | Sengupta | 501/137 |
| 5,635,434 A | | 6/1997 | Sengupta | 501/138 |
| 5,640,042 A | | 6/1997 | Koscica et al. | 257/595 |
| 5,689,071 A | * | 11/1997 | Ruffner et al. | 73/861.84 |
| 5,693,429 A | | 12/1997 | Sengupt et al. | 428/699 |
| 5,694,134 A | | 12/1997 | Barnes | 343/700 |
| 5,766,697 A | | 6/1998 | Sengupta et al. | 427/585 |
| 5,773,723 A | | 6/1998 | Lewis et al. | 73/861.12 |
| 5,830,591 A | | 11/1998 | Sengupta et al. | 428/701 |
| 5,831,176 A | | 11/1998 | Morgenthale et al. | 73/861.77 |
| 5,846,893 A | | 12/1998 | Sengupta et al. | 501/137 |
| 5,886,867 A | | 3/1999 | Chivukula et al. | 361/311 |
| 5,985,002 A | | 11/1999 | Grantham | 95/47 |
| 5,990,766 A | | 11/1999 | Zhang et al. | 333/205 |
| 6,074,971 A | | 6/2000 | Chiu et al. | 501/139 |
| 6,130,648 A | | 10/2000 | Rulf et al. | 343/770 |
| 6,133,878 A | | 10/2000 | Lee | 343/700 |
| 6,170,539 B1 | | 1/2001 | Pope et al. | 141/59 |
| 6,218,995 B1 | | 4/2001 | Higgins et al. | 343/719 |
| 6,260,420 B1 | | 7/2001 | Ketelsen et al. | 73/861.12 |
| 6,336,479 B1 | * | 1/2002 | Nanaji | 141/4 |
| 6,338,369 B1 | | 1/2002 | Shermer et al. | 141/83 |
| 6,377,142 B1 | | 4/2002 | Chiu et al. | 333/238 |
| 6,377,217 B1 | | 4/2002 | Zhu et al. | 343/700 |
| 6,377,440 B1 | | 4/2002 | Zhu et al. | 361/311 |
| 6,386,246 B2 | * | 5/2002 | Pope et al. | 141/59 |
| 6,404,614 B1 | | 6/2002 | Zhu et al. | 361/277 |
| 6,492,883 B2 | | 12/2002 | Liang et al. | 333/132 |
| 6,514,895 B1 | | 2/2003 | Chiu et al. | 501/137 |
| 6,525,630 B1 | | 2/2003 | Zhu et al. | 333/205 |
| 6,531,936 B1 | | 3/2003 | Chiu et al. | 333/164 |
| 6,535,076 B2 | | 3/2003 | Partridge et al. | 333/17.1 |
| 6,538,603 B1 | | 3/2003 | Chen et al. | 342/372 |
| 6,556,102 B1 | | 4/2003 | Sengupta et al. | 333/161 |
| 6,590,468 B2 | | 7/2003 | du Toit et al. | 333/17.3 |
| 6,597,265 B2 | | 7/2003 | Liang et al. | 333/204 |

\* cited by examiner

INCREASED SENSITIVITY FOR TURBINE FLOW METER

FIELD OF THE INVENTION

The present invention relates to a turbine flow meter design for measurement of liquid or gaseous materials that yields increased sensitivity for turbine rotor pickup with a lower production cost.

BACKGROUND OF THE INVENTION

Flow meters are used for a variety of applications where it is desired to measure the flow rate or volume of a given fluid or gaseous material. Some meters are inferential meters, meaning that the actual displacement of the liquid or gaseous material is not measured. An inferential meter uses some other characteristic other than actual displacement to measure flow rate or volume. Inferential meters sometimes have advantages over positive displacement meters, including smaller size. However, inferential meters are also sometimes more costly than positive displacement meters since inferential meters often include more complex designs and require supporting electronics to properly operate. Therefore, it may be important to find methods of reducing the cost of an inferential meter so that the cost of using an inferential meter versus a positive displacement meter is minimized if not eliminated.

One example of an inferential meter is known as a turbine flow meter, like that described in U.S. Pat. No. 5,689,071. The turbine flow meter described in this patent measures the flow rate of a fluid or gaseous material by determining the number of rotations of a turbine rotor located inside the flow path of the meter. The meter is comprised of a hollow housing that includes a turbine rotor on a shaft inside the flow path created by the housing. The housing is constructed out of a high permeable material, such as stainless steel.

As material enters the inlet port of the meter, the material passes through the turbine rotors causing the turbine rotors to rotate at a rate that depends on the flow rate of the material passing through the housing. The rotational velocity of the turbine rotor is sensed by a pickoff coil. The pickoff coil is excited by an a-c signal that produces a magnetic field. As the turbine rotor rotates, the vanes on the turbine rotor pass through the magnetic field generated by the pickoff coil, superimposing a pulse upon the carrier waveform of the pickoff coil. The superimposed pulses occur at a repetition rate (pulses per second) proportional to rotor velocity and hence proportional to the measured rate of fluid flow.

The pickoff coil is countersunk in a port that is drilled into the housing, but the pickoff coil does not reach the inner portion of the housing. Since the housing is constructed out of a high permeable material, the signal generated by the pickoff coil penetrates the housing to reach the vanes of the turbine rotor and superimposed pulses are detectable by the pickoff coil through the housing as well. One method to reduce the cost of this turbine flow meter is to use a lower cost housing material since the housing material comprises a large majority of the material used in the turbine flow meter. However, less costly materials, such as aluminum for example, have a low permeability thereby making it difficult or impossible for the pickoff coil to detect the rotation of the turbine rotor inside the housing.

Therefore, it is desirable to find a technique to use a lower cost, lower permeable material for the housing of the turbine flow meter without disturbing the performance of the pickoff coil.

SUMMARY OF THE INVENTION

The present invention relates to a lower cost turbine flow meter. The turbine flow meter is comprised of an outer housing constructed out of a low permeable material forming an inlet port on one end of the outer housing and an outlet port on the other end of the outer housing. A shaft is supported inside the outer housing along an axis parallel to the outer housing. A turbine rotor is mounted on the shaft, wherein the turbine rotor rotates when the material flows through the inlet port. An orifice is contained in the outer housing that forms a first pickup port wherein a first end of the orifice extends outward to the outer surface of the outer housing, and the second end of the orifice extends down to a higher permeable inner housing proximate to the turbine rotor. A first pickup coil is mounted within the first pickup port and is excited by a signal received through the inner housing from the turbine rotor as the turbine rotor rotates when fluid passes through the meter.

The inner housing may be comprised of a hollow, cylindrical shaped high permeable material that is placed between the shaft and the outer housing such that the inner housing completely surrounds the shaft and the turbine rotors. Or the inner housing may be a plug of high permeable material that is placed inside an orifice in the outer housing proximate to the turbine rotor in order to conserve costs by providing low permeable material.

The turbine meter may contain more than one turbine rotor and more than one pickoff port and coil so that a controller can determine the ratio of the rotation speed of one turbine rotor to the other to determine the flow rate of the fluid or gas flowing through the turbine meter. Also, more than one pickoff port and coil may be provided for a single turbine rotor so that the direction of rotation of the turbine rotor can be detected to detect backflow of gas or liquid in the turbine meter.

The turbine meter may be used in a fuel dispenser application. The turbine meter may be used to measure fuel in a fuel dispenser, the vapor being returned to the underground storage tank in a stage two vapor recovery fuel dispenser, or vapor or air released to atmosphere from the ullage area of an underground storage tank when a pressure relief valve in a vent stack is opened on the underground storage tank to relieve pressure.

The turbine meter data in a fueling environment may be used to determine the vapor-to-liquid (V/L) ratio of a stage two vapor recovery dispenser to adjust the vapor recovery system to operate within desired V/L limits or to provide diagnostic data about measured fuel, vapor and/or air to a site controller or tank monitor for compliance monitoring and reporting.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is related to a lower cost turbine flow meter for measuring the flow rate and/or volume of a gas or liquid. The flow meter is comprised of an inner housing constructed out of a high permeable material surrounded by an outer housing constructed out of a lower cost, lower permeable material. A port is placed in the outer housing that runs down to the surface of the inner housing to detect the rotation of turbine rotors that rotate inside the fluid meter as fluid or gas flows through the meter. Pickoff coils are placed in the port to generate a magnetic signal to penetrate through the higher permeable inner housing wherein the turbine rotor vanes superimpose a pulse signal on the magnetic signal. This pulse signal is used to determine the flow rate and/or volume of the fluid or gas passing through the flow meter. Because the pickoff coil is placed at the surface of the higher permeable inner housing material instead of the surface of the lower permeable outer housing, detection of rotation of the turbine rotors is possible. If the housing of the turbine flow meter was totally constructed out of a high permeable material, and/or the pickoff coil was not placed at the surface of a higher permeable material to allow a magnetic signal generated by the pickoff coil to penetrate through the housing to reach the turbine rotors, the turbine flow meter would either not work correctly or be defective in its operation.

Figure 1A:
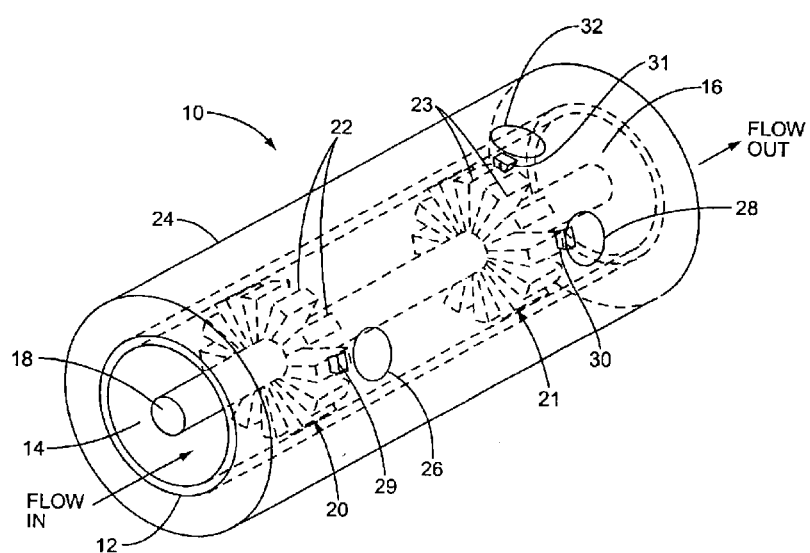
FIG. 1A is a schematic diagram of the turbine flow meter according to the present invention.

FIG. 1A illustrates a turbine flow meter 10 according to the present invention. This turbine flow meter is like that described in U.S. Pat. No. 5,689,071 entitled "Wide range, high accuracy flow meter," incorporated herein by reference in its entirety. The turbine flow meter 10 is comprised of an inner housing 12 that is constructed out of a high permeable material, such as monel, a nickel-copper alloy, steel, stainless steel, and 400-series non-magnetic stainless steel, for example. The inner housing 12 is hollow and forms an inlet port 14 and an outlet port 16 for fluid or gas to enter into the flow meter 10 and to leave the flow meter 10, respectively.

A shaft 18 is placed internal to the internal housing 12 to support one or more turbine rotors 20, 21. The turbine rotor 20 may be also called the "first turbine rotor," and the turbine rotor 21 may also be called the "second turbine rotor."

The turbine rotors 20, 21 rotate in an axis perpendicular to the axis of the shaft 18. The turbine rotors 20, 21 contain one or more vanes 22, 23, also known as blades. As the fluid or gas passes through the inlet port 14 and across the vanes 22, 23 of the turbine rotors 20, 21, the turbine rotors 20, 21 and vanes 22, 23 rotate at a speed proportional to the rate of flow of the gas or liquid flowing through the turbine flow meter 10. The proportion of the rotational speed of one turbine rotor 20 to the other turbine rotor 21, as determined by counting the vanes 22, 23 passing by the pickoff coils 29, 30, to determine the flow rate of the fluid or gas passing through the meter 10, as is described in U.S. Pat. No. 5,689,071, previously referenced herein. It is noted that the turbine flow meter 10 can be provided with only one turbine rotor 20 to detect flow rate as well. In the present invention, the inner housing 12 is surrounded by an outer housing 24 constructed out of a lower permeable material than the inner housing 12, including but not limited to aluminum, plastic, ceramic, ferrous metal, and non-ferrous metal. Lower permeable materials are typically cheaper than higher permeable materials and therefore provide a lower cost of manufacture. Since the housing structure of the turbine flow meter 10 comprises a majority of the amount of raw material used in constructing a turbine flow meter 10, all savings that can be achieved by using a lower cost material to form the outer housing 24 will be a significant cost reduction in the overall cost of the turbine flow meter 10.

Figure 1B:
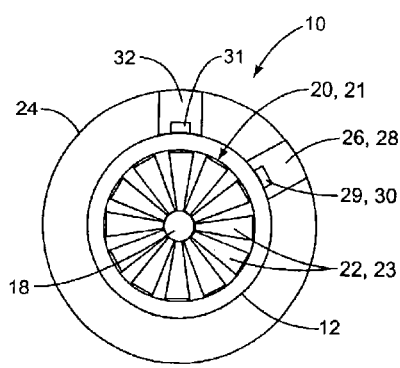
FIG. 1B illustrates a side view of FIG. 1A.

FIG. 1B illustrates a side view of the turbine flow meter 10 illustrated in FIG. 1A. The shaft 18 and turbine rotors 20, 21 with its vanes 22, 23 located inside the inner housing 12 are illustrated. The thickness of the inner housing 12 is much less than the thickness of the outer housing 24; however, these thicknesses are a matter of design choice and the present invention is not limited to any particular thickness. What is important is that the outer housing 24 be constructed of a lower cost material and of a less permeable material than the inner housing 12.

In order to detect the rotation of the turbine flow meter 10 to then derive the flow rate or volume of the fluid flowing through the turbine flow meter 10, one or more pickup ports 26, 28 are drilled into the outer housing 24 during the manufacture of the meter 10 so that the ports 26, 28 extend all the way to the surface area of the inner housing 12. The port 26 may be called the "first port," and the port 28 may be called the "second port." The ports 26, 28 allow the pickoff coils 29, 30 to be placed inside each of the ports 26, 28 at the surface area of the inner housing 12. The pickoff coils 29, 30 may be like those described in U.S. Pat. No. 5,689,071, previously referenced.

The pickoff coils 29, 30 generate a magnetic signal that penetrates through the higher permeable inner housing 12 to reach the turbine rotors 20, 21. As the turbine rotors 20, 21 rotate, the vanes 22, 23 superimpose a pulse signal on the magnetic signal generated by the pickoff coils 29, 30. This pulse signal can be later analyzed by a microprocessor or other control system (not shown) to determine the rate of pulses that correlates to the volume or flow rate of the fluid or gas flowing through the turbine flow meter 10.

In the embodiment illustrated in FIGS. 1A and 1B, two ports 26, 28 are provided for two pickoff coils 29, 30 to be used. However, it is noted that an alternative embodiment of the present invention only involves use of one turbine rotor 20 with one port and one pickup coil since the flow rate of the fluid or gas passing through the meter 10 can be measured by just using the rotation speed of one turbine rotor.

In yet another variation of the present invention, another port 32 and pickoff coil 31 may be provided, as illustrated in FIGS. 1A and 1B. This additional port 32 is placed in proximity to the turbine rotor 21 so that the turbine rotor 21 has two ports and two pickoff coils 30, 31. Use of two pickoff coils 30, 31, via ports 28, 32, on one turbine rotor 21 allows detection of direction of rotation of the turbine rotor 21 as well as the speed. If the turbine rotor 21 is rotating in a direction opposite from a normal direction, this indicates that a backflow of gas or liquid is passing back through the meter 10. In this event, the measured backflow of gas or liquid, as measured by the detection of the rotation of the vanes 22, 23 on the turbine rotor 21 is subtracted from the total flow rate or volume of the gas or liquid passing through the meter 10 to arrive at an accurate measurement. It should be noted that port 32 may be provided with either turbine rotor 20, 21.

Figure 2A:
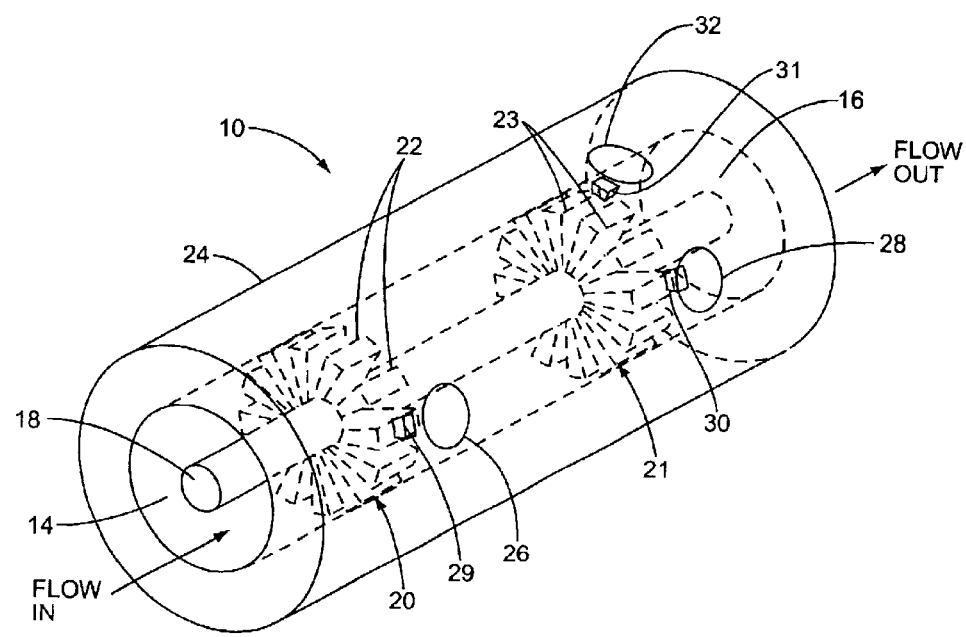
FIG. 2A is a schematic diagram of a turbine flow meter according to an alternative embodiment of the present invention.
Figure 2B:
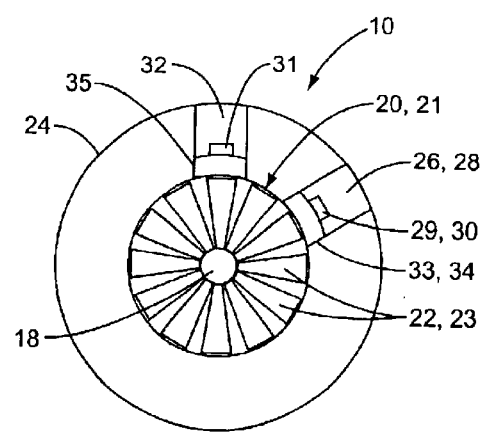
FIG. 2B illustrates a side view of FIG. 2A.

FIGS. 2A and 2B (a side view of FIG. 2A) illustrate another embodiment of the turbine flow meter 10 that may be used with the present invention. In FIGS. 2A and 2B, the body of the turbine flow meter 10 only includes a single outer housing 24 comprised of a lower permeable material. The ports 26, 28, and port 32 if provided, are formed by holes drilled all the way through the outer housing 24 such that the ports 26, 28, 32 (if provided) form an orifice from the outer surface of the outer housing 24 all the way to the inside of the flow meter 10 without interruption or blockage. Next, plugs 33, 34, 35 constructed out of higher permeable material than the outer housing 24 are placed inside the ports 26, 28, 32. One end of the plugs 33, 34, 35 is substantially flush with the inside of the inner housing 24 of the meter 10. The plugs 33, 34, 35 are typically less in length that the length of the ports 26, 28, 32 so that pickoff coils 29, 30, 31 may still be placed inside the ports 26, 28, 32 resting against or in close proximity to the other end of the plugs 33, 34, 35. However, the plugs 33, 34, 35 could extend out of the outer housing 24 if desired.

In this manner, the rotation of the vanes 22, 23 will still be detectable since the higher permeable plugs 33, 34, 35 are placed in between the pickoff coils 29, 30, 31 and the vanes 22, 23. This allows even less of the higher cost, higher permeable material to be used in the construction of the turbine meter 10 to yield even a lower manufacturing cost. It should be noted that the embodiment illustrated in FIGS. 2A and 2B may be provided with one port 26, two ports 26, 28 or the three ports 26, 28, 30 as illustrated in FIGS. 1A and 1B.

Figure 3:
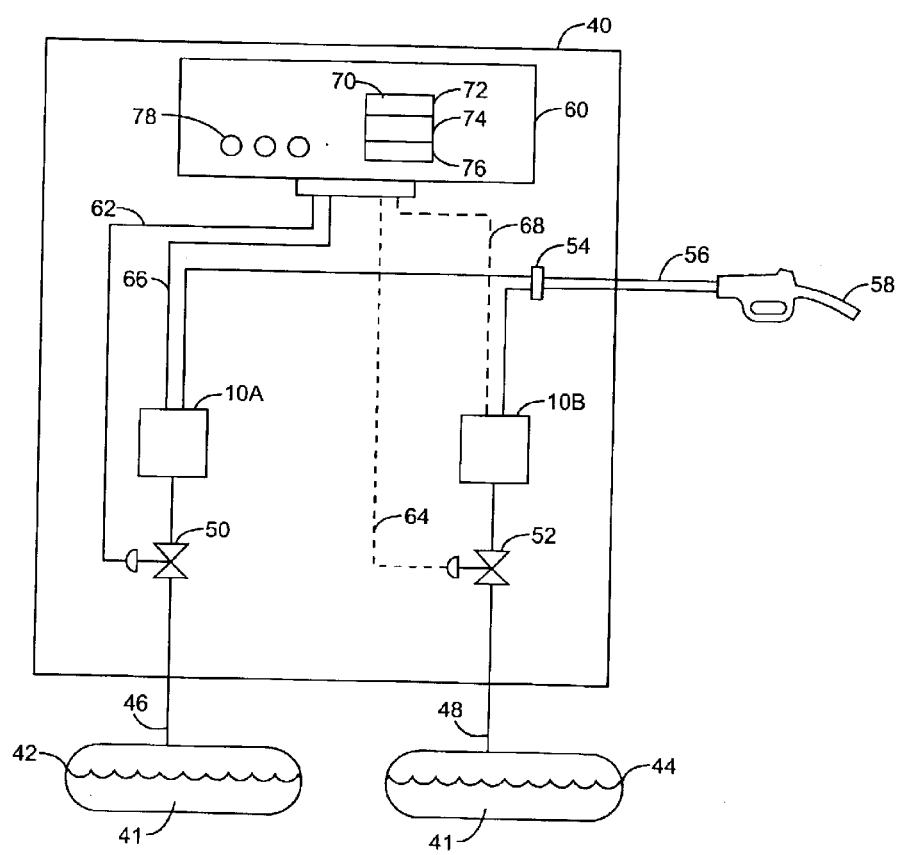
FIG. 3 is a schematic diagram of the turbine flow meter according to the present invention used as a fuel metering device in a fuel dispenser for fueling vehicles.

FIG. 3 illustrates use of the turbine flow meter 10 according to the present invention in a fuel dispenser 40. The purpose of a fuel dispenser 40 is to measure the amount of fuel being delivered to a vehicle (not shown). Very accurate meters are required to measure fuel dispensing to comply with Weights & Measures regulatory requirements. The fuel dispenser 40 may be a blending type fuel dispenser wherein a low-octane fuel 41 stored in a low-octane underground storage tank 42 and a high-octane fuel 43 stored in a high-octane underground storage tank 44 are blended together by the fuel dispenser 40 to deliver either a low-octane fuel 41, high-octane fuel 43, or a mixture of both to a vehicle. The low-octane fuel 41 is supplied to the fuel dispenser 40 through a low-octane fuel supply conduit 46.

Likewise, the high-octane fuel 43 is delivered to the fuel dispenser 40 through a high-octane fuel supply conduit 48. Both the low-octane fuel 41 and the high-octane fuel 43 pass through the fuel dispenser 40 in their own independent flow paths. Each fuel 41, 43 encounters a valve 50, 52 that controls whether the fuel is allowed to enter into the fuel dispenser 40, and if so at what flow rate. Valves 50, 52 may be proportionally controlled and are under the control of a controller 60 in the fuel dispenser 40.

The controller 60 determines when a fueling operation is allowed to begin. Typically, a customer is required to push a start button 78 to indicate which octane of fuel 41, 43 is desired, and the controller 60 thereafter controls the valves 50, 52 to allow the low-octane fuel 41 or the high-octane fuel 43 to be dispensed, depending on the type of octane of fuel selected by the customer. After the fuel 41, 43 passes through both the valves 50, 52 (if a blended octane fuel was selected by the customer), the fuels 41, 43 flow through turbine flow meters 10A, 10B according to the present invention. If only a low-octane fuel 41 or high-octane fuel 43 was selected by the customer to be dispensed, the controller 60 would only open one of the valves 50, 52. As the fuels 41, 43 flow through the turbine flow meters 10A, 10B, pickoff coils 29, 30 (not shown) on each of the turbine flow meters 10A, 10B produce a pulser signal 66, 68 that is input into the controller 60. The controller 60 determines the amount of flow of fuel flowing through turbine flow meters 10A, 10B for the purpose of determining the amount to charge a customer for delivery of such fuel. The controller 60 uses the data from the pulser signal 66, 68 to generate a totals display 70.

The totals display 70 is comprised of an amount to be charged to the customer display 72, the amount of gallons dispensed display 74 and the price per unit of fuel display 76. Also, U.S. Pat. No. 4,876,653 entitled "Programmable multiple blender" describes a blender operation like that illustrated in FIG. 3 and is incorporated herein by reference in its entirety. As either the low-octane fuel 41, high-octane fuel 43, or both pass through their respective turbine flow meters 10A, 10B, the fuels come together in the blend manifold 54 to be delivered through the hose 56 and nozzle 58 into the vehicle.

Figure 4:
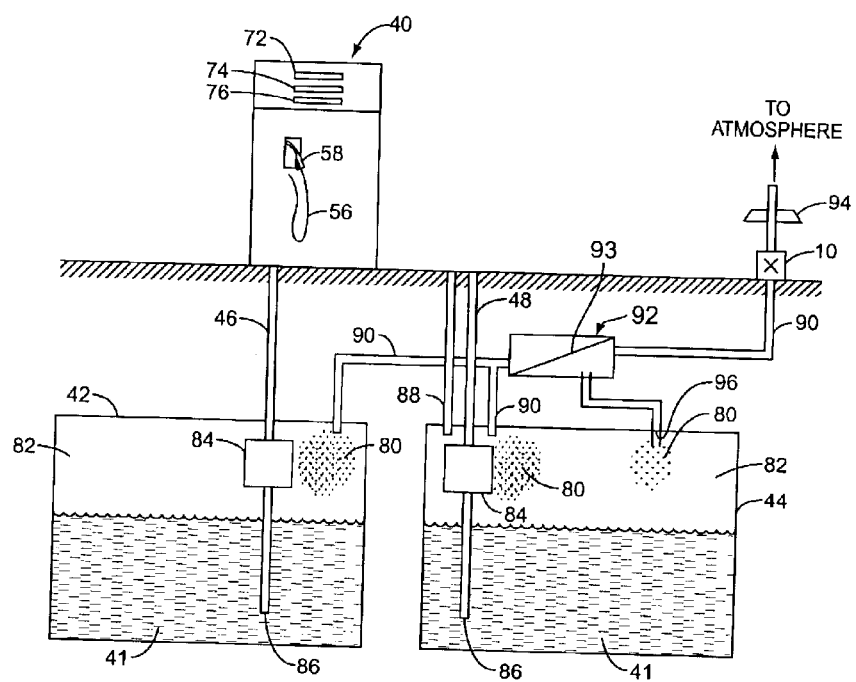
FIG. 4 is a schematic diagram of the turbine flow meter used as a fugitive emission meter for an underground storage tank in a service station environment.

FIG. 4 illustrates another application for use of the turbine flow meter 10 in a service station environment. FIG. 4 illustrates an underground storage tank pressure reduction system like that described in U.S. Pat. No. 5,464,466 entitled "Fuel storage tank vent filter system," incorporated herein by reference in its entirety. The fuel dispenser 10 is a vapor recovery fuel dispenser wherein vapor captured during refueling of a vehicle is passed back to the ullage area 82 of an underground storage tank 42, 44. The ullage area 82 of the underground storage tank 42, 44 contains vapor 80. If the pressure inside underground storage tank 42, 44 rises to a certain level, the membrane system 92 is activated to separate the hydrocarbons from the vapor 80. As the hydrocarbons are separated from the vapor 80, the hydrocarbons are returned to the ullage area 82 of the underground storage tank 42, 44 via a vapor return line 96. The membrane 92 may either permeate hydrocarbons or permeate oxygen or air as disclosed in U.S. Pat. Nos. 5,464,466 and 5,985,002, incorporated herein by reference in their entirety.

The air that is separated from a hydrocarbon in the vapor 80 is then released to atmosphere through a vent stack 90 and a turbine flow meter 10. The amount of air is measured and then released to atmosphere if there is sufficient pressure to release pressure valve 94. It may be desirable to measure the amount of air flowing through the vent stack 90 using the turbine flow meter 10 to determine how often and how much air is separated by the membrane 92 and released to atmosphere for any number of diagnostic or information purposes. Because of the small size of the turbine flow meter 10 and other diagnostic information it can provide, use of the turbine flow meter 10 in the vent stack 10 may be particularly useful.

Figure 5:
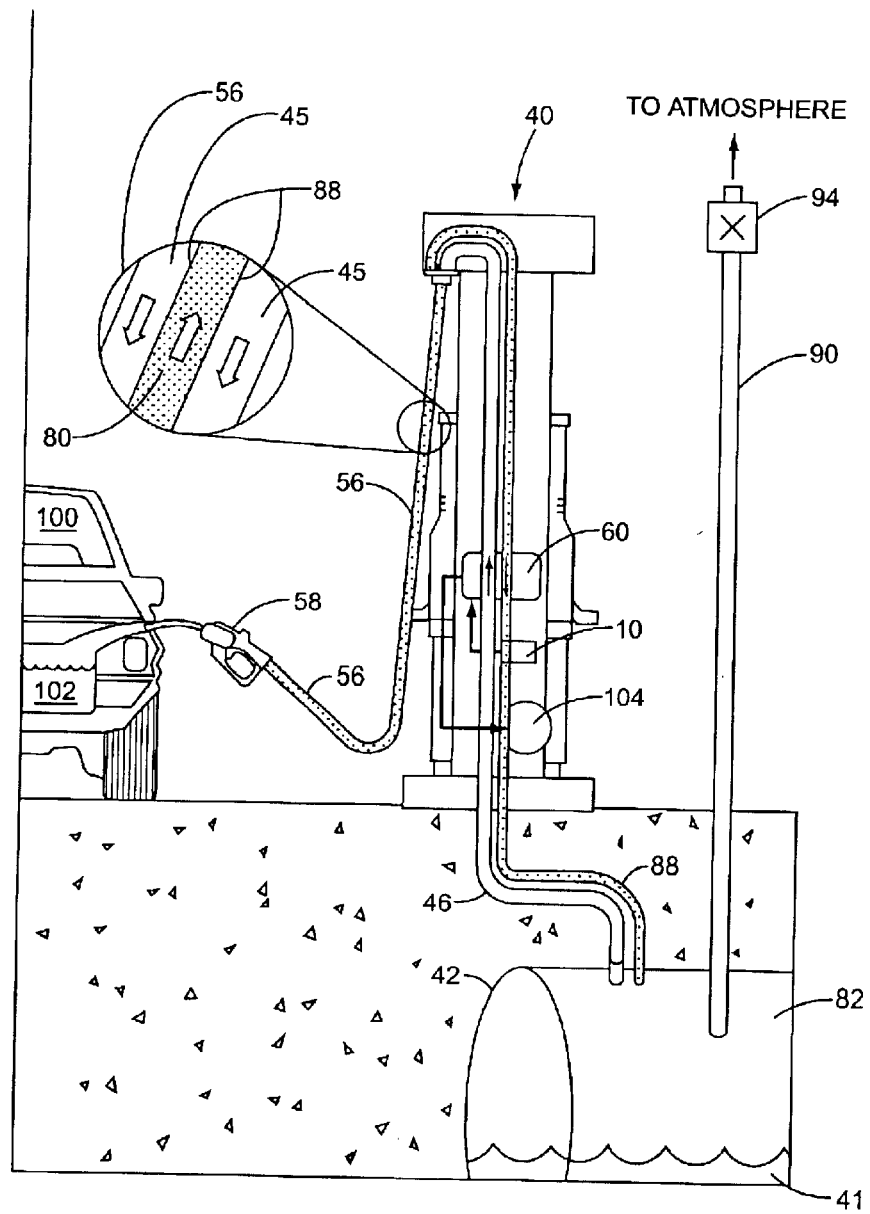
FIG. 5 is a schematic diagram of the turbine flow meter used as a vapor flow meter for adjusting the vapor recovery system of a fuel dispenser.

FIG. 5 describes another application for use of the turbine flow meter 10 wherein the turbine flow meter 10 measures the amount of vapor 80 being returned to the underground storage tank 42 in a stage two vapor recovery system. Fuel 41 is delivered from the underground storage tank 42 via a fuel supply conduit 46 to the fuel dispenser 40. As the fuel 41 enters the hose 56 and is delivered to the vehicle 100 through a nozzle 58, the vapor 80 present in the vehicle fuel tank 102 is displaced out of the vehicle 100. The hose 56 and nozzle 58 are configured to provide a separate return path known as a vapor return line 88 to allow vapor 80 to be captured by the fuel dispenser 40. The vapor 80 is returned back to the underground storage tank 42 through the vapor return line 88 into the ullage area 82 of the underground storage tank 42.

As vapor 80 is passed through the vapor return line 88 in the fuel dispenser 40, the vapor 80 passes through a turbine flow meter 10. The turbine flow meter 10 measures the amount of vapor flow being returned to the underground storage tank 42 for the purpose of determining if the fuel dispenser 40 is recovering the correct amount of vapor 80 in relation to the fuel 41 dispensed into the vehicle 100. Since there is a relationship between the amount of fuel 41 dispensed into the vehicle 100 and the amount of vapor 80 displaced from the vehicle fuel tank 102, a relationship can be derived known as the "vapor to liquid ratio" (V/L ratio).

Figure 6:
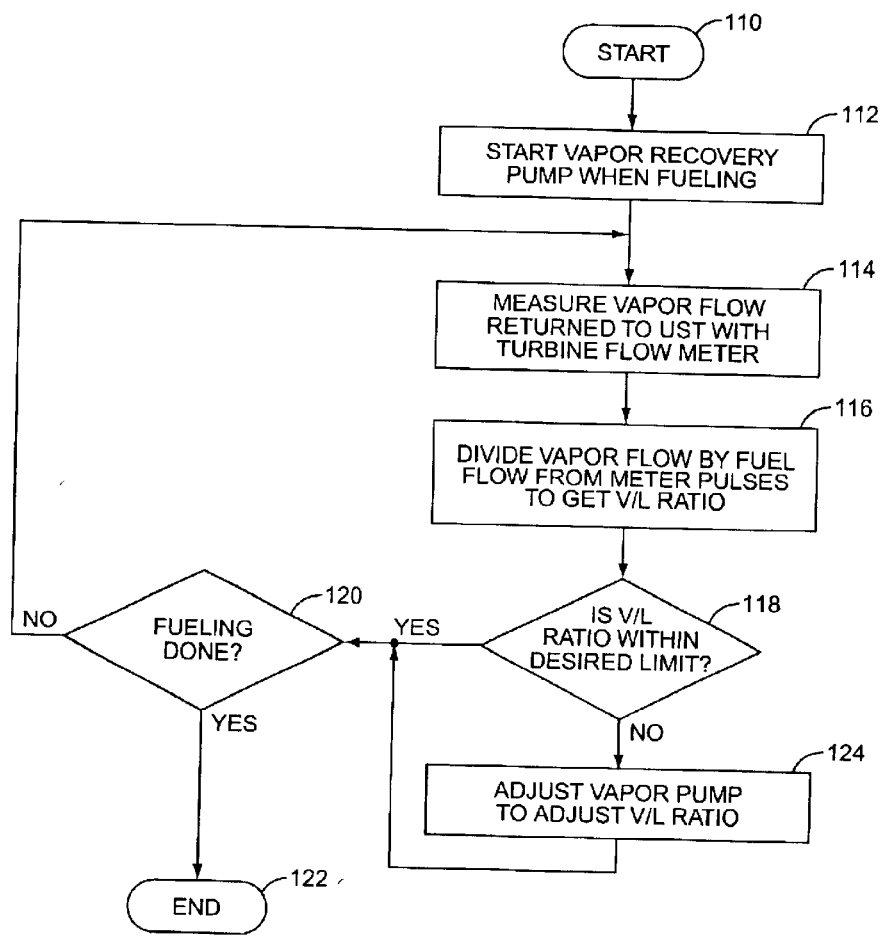
FIG. 6 is a schematic diagram of the flowchart process of adjusting the vapor recovery system of a fuel dispenser based on use of the turbine meter as a vapor flow meter, as illustrated in FIG. 5.

The controller 60 is configured to determine the V/L ratio by calculating the V/L ratio as determined by the pulse signal from the turbine flow meter 10, which may be called a vapor flow meter, in the vapor return line 88 (numerator), and the pulse signal from the turbine flow meter 10 that measures the amount of fuel 41 dispensed into the vehicle 100 (denominator). FIG. 6 illustrates a flow chart for one embodiment wherein a fuel dispenser 40 calculates the V/L ratio and adjusts the fuel dispenser 40 vapor recovery system in response.

The process starts (block 110), and the fuel dispenser 40 starts a vapor recovery pump 104 to create a vacuum in the vapor return line 88 (block 112). As fuel 41 is dispensed into the vehicle fuel tank 102, vapor 80 is returned in the vapor return line 88 and flows through the turbine flow meter 10. The pulser output from the turbine flow meter 10 is communicatively coupled to a controller 60 in the fuel dispenser 40. The controller 60 measures the amount of vapor flow in the vapor return line 88 being returned to the underground storage tank 42 (block 114). The controller 60 then divides the amount of vapor flow by the fuel flow rate to arrive at a V/L ratio (block 116).

The controller 60 next determines if the V/L ratio is within desired limits (decision 118). If the V/L ratio is within desired limits, the process determines if fueling has been completed (decision 120). If so, the process ends (block 122). If not, the controller 60 continues to measure the vapor flow and calculate the V/L ratio to determine if it is within desired limits (blocks 114, 116, 118). If the V/L ratio was not within the desired limits (decision 118), the controller 60 adjusts the vapor pump 104 and/or vapor recovery system to adjust the V/L ratio to attempt to put it within desired limits (block 124). This may be done by any number of methods, including adjusting the speed of the vapor pump 104 or adjusting vapor valves (not shown) that control the amount of vapor 80 being returned to the underground storage tank 42. More information on stage two vapor recovery systems for fuel dispensers may be found in patents Reissue Pat. No. 35,238, U.S. Pat. Nos. 6,170,539; 6,336,479; 6,338,369; and 6,386,246, all of which are incorporated herein by reference in their entireties.

Figure 7:
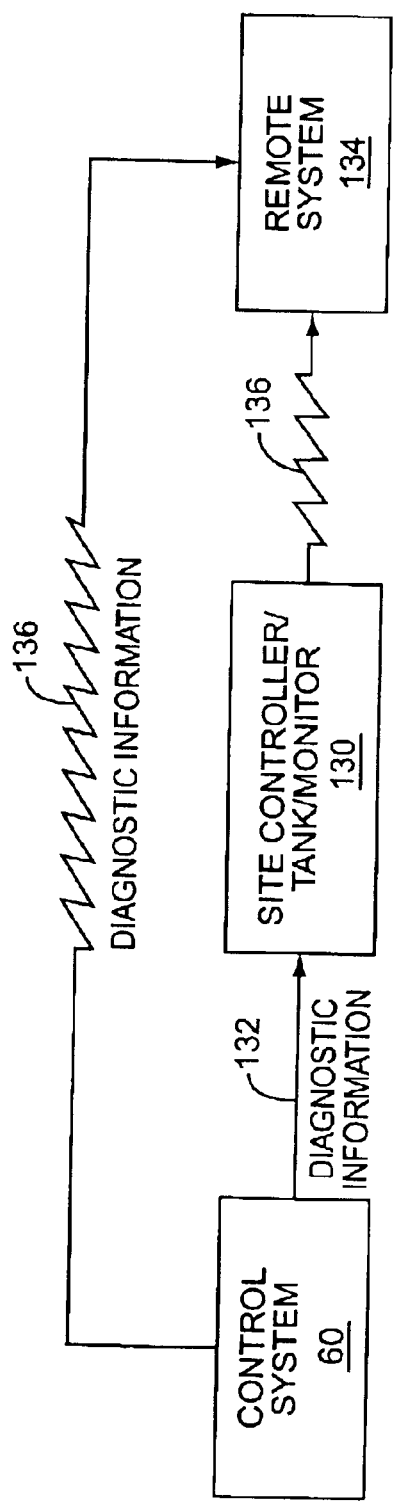
FIG. 7 is a schematic diagram of a diagnostic reporting architecture for the turbine flow meter.

FIG. 7 illustrates a communication architecture whereby flow data from the turbine flow meter is communicated to other systems. As previously described, the flow data from the turbine flow meter 10 is communicated to the controller 60 for processing and measuring purposes, including the applications previously described. The controller 60 may then pass the diagnostic information to a site controller/tank monitor 130 over a local communication line 132 for purposes such as diagnostics or any other application desired. The site controller/tank monitor 130 may in turn pass such information regarding the turbine flow meter 10 to a remote system 134 via a remote communication line 136 for the same purpose. The controller 60 may also be configured to communicate the flow data from the turbine flow meter 10 directly to the remote system 134 via the remote communication line 136 rather than through an intermediate site controller/tank monitor 130.

Those skilled in the art will recognize improvements and modifications to the preferred embodiments of the present invention. All such improvements and modifications are considered within the scope of the concepts disclosed herein and the claims that follow.

What is claimed is:

1. A turbine flow meter that measures the flow of a material, comprising:
    an outer housing comprised of a low permeable material forming an inlet port on one end of said outer housing and an outlet port on the other end of said outer housing;
    a shaft supported inside said outer housing along an axis parallel to said outer housing;
    a turbine rotor mounted on said shaft, wherein said turbine rotor rotates when the material flows through said inlet port;
    an orifice contained in said outer housing that forms a first pickup port wherein a first end of said orifice extends outward to the outer surface of said outer housing, and said second end of said orifice extends down to a higher permeable inner housing proximate to said turbine rotor; and
    a first pickup coil that is mounted within said first pickup port and excited by a signal received through said inner housing from said turbine rotor as said turbine rotor rotates.

2. The meter of claim 1, further comprising a second turbine rotor mounted on said shaft that rotates oppositely from said turbine rotor.

3. The meter of claim 1, wherein said inner housing is made from a material comprised from the group consisting of monel, a nickel-copper alloy, steel, stainless steel, and 400-series non-magnetic stainless steel.

4. The meter of claim 1, wherein said outer housing is made from a material comprised from the group consisting of aluminum, plastic, ceramic, ferrous metal, and non-ferrous metal.

5. The meter of claim 1, wherein said turbine rotor contains a plurality of vanes that cause said turbine rotor to rotate when said material comes into contact with said plurality of vanes.

6. The meter of claim 1, wherein said material is comprised from the group consisting of a liquid and a gas.

7. The meter of claim 1, further comprising:
a second orifice contained in said outer housing that forms a second pickup port wherein a first end of said second orifice extends outward to the outer surface of said outer housing, and said second end of said second orifice extends down to a higher permeable inner housing proximate to said turbine rotor; and
a second pickup coil that is mounted within said second pickup port and excited by a signal received through said inner housing from said turbine rotor as said turbine rotor rotates.

8. The meter of claim 1, wherein said inner housing is comprised of a plug that is substantially the same size in diameter as said orifice.

9. The meter of claim 1, wherein said inner housing is comprised of a cylindrical-shaped material that is placed in between said shaft and said outer housing.

10. A fuel dispenser for dispensing fuel to a vehicle, comprising:
a nozzle;
a hose connected to said nozzle;
a control system;
a fuel delivery line having an inlet port that receives fuel, and an outlet port that couples to said hose;
a valve located inline said fuel delivery line and under control of said control system, wherein said control system opens said valve to allow fuel to flow through said fuel delivery line to be delivered through said hose and said nozzle to the vehicle; and
a turbine meter located inline said fuel delivery line, comprising:
an outer housing comprised of a low permeable material forming an inlet port on one end of said outer housing and an outlet port on the other end of said outer housing;
a shaft supported inside said outer housing along an axis parallel to said outer housing;
a turbine rotor mounted on said shaft, wherein said turbine rotor rotates when the material flows through said inlet port;
an orifice contained in said outer housing that forms a first pickup port wherein a first end of said orifice extends outward to the outer surface of said outer housing, and said second end of said orifice extends down to a higher permeable inner housing proximate to said turbine rotor; and
a first pickup coil that is mounted within said first pickup port and excited by a signal received through said inner housing from said turbine rotor as said turbine rotor rotates;
said turbine meter measures the amount of fuel traveling through said fuel delivery line and sends a signal indicated of the amount of fuel to said control system.

11. The fuel dispenser of claim 10, wherein said turbine meter further comprises a second turbine rotor mounted on said shaft that rotates oppositely from said turbine rotor.

12. The fuel dispenser of claim 10, wherein said turbine rotor contains a plurality of vanes that cause said turbine rotor to rotate when said material comes into contact with said plurality of vanes.

13. The fuel dispenser of claim 10, wherein said turbine meter further comprises:
a second orifice contained in said outer housing that forms a second pickup port wherein a first end of said second orifice extends outward to the outer surface of said outer housing, and said second end of said second orifice extends down to a higher permeable inner housing proximate to said turbine rotor; and
a second pickup coil that is mounted within said second pickup port and excited by a signal received through said inner housing from said turbine rotor as said turbine rotor rotates.

14. The fuel dispenser of claim 10, wherein said inner housing is comprised of a plug that is substantially the same size in diameter as said orifice.

15. The fuel dispenser of claim 10, wherein said inner housing is comprised of a cylindrical-shaped material that is placed in between said shaft and said outer housing.

16. The fuel dispenser of claim 10, further comprising a totals display that displays the total amount of fuel metered through said turbine meter.

17. A vapor recovery system, comprising:
an underground storage tank that contains fuel and vapor;
a vent coupled to said underground storage tank;
a membrane coupled inline to said vent that receives said vapor from said underground storage tank and substantially separates said vapor into a hydrocarbon mixture and an air mixture;
a pressure valve coupled inline to said vent downstream of said membrane wherein said pressure valve is opened to release said air mixture to atmosphere when said underground storage tank is under a threshold pressure and said hydrocarbon mixture is returned back to said underground storage tank; and
a turbine flow meter that measures the amount of air being released to atmosphere, comprising:
an outer housing comprised of a low permeable material forming an inlet port on one end of said outer housing and an outlet port on the other end of said outer housing;
a shaft supported inside said outer housing along an axis parallel to said outer housing;
a turbine rotor mounted on said shaft, wherein said turbine rotor rotates when said material flows through said inlet port;
an orifice contained in said outer housing that forms a first pickup port wherein a first end of said orifice extends outward to the outer surface of said outer housing, and said second end of said orifice extends down to a higher permeable inner housing proximate to said turbine rotor; and
a first pickup coil that is mounted within said first pickup port and excited by a signal received through said inner housing from said turbine rotor as said turbine rotor rotates;
said turbine meter measures the amount of air mixture traveling through said vent.

18. The system of claim 17, wherein said turbine meter further comprises a second turbine rotor mounted on said shaft that rotates oppositely from said turbine rotor.

19. The system of claim 17, wherein said turbine rotor contains a plurality of vanes that cause said turbine rotor to rotate when said material comes into contact with said plurality of vanes.

20. The system of claim 17, wherein said turbine meter further comprises:
a second orifice contained in said outer housing that forms a second pickup port wherein a first end of said second orifice extends outward to the outer surface of said outer housing, and said second end of said second orifice extends down to a higher permeable inner housing proximate to said turbine rotor; and a second pickup coil that is mounted within said second pickup port and excited by a signal received through said inner housing from said turbine rotor as said turbine rotor rotates.

21. The system of claim 17, wherein said inner housing is comprised of a plug that is substantially the same size in diameter as said orifice.

22. The system of claim 17, wherein said inner housing is comprised of a cylindrical-shaped material that is placed in between said shaft and said outer housing.

23. The system of claim 17, wherein said first pickup coil generates a signal indicative of the amount of air mixture and communicates said signal to a site controller.

24. A vapor recovery system that captures vapors expelled from a vehicle during refueling and returns the vapors to an underground storage tank, comprising:

a fuel dispenser comprising a control system and a vapor recovery system that captures vapors expelled from the vehicle during refueling and returns the vapors through a vapor return line to the underground storage tank;

a turbine flow meter coupled inline to said vapor return line that measures the amount of vapors being returned to the underground storage tank wherein said control system adjusts said vapor recovery system to vary the rate of recovery of the vapors based on the measurement of the amount of vapors being returned to the underground storage tank, said turbine flow meter comprising:

an outer housing comprised of a low permeable material forming an inlet port on one end of said outer housing and an outlet port on the other end of said outer housing;

a shaft supported inside said outer housing along an axis parallel to said outer housing;

a turbine rotor mounted on said shaft, wherein said turbine rotor rotates when the material flows through said inlet port;

an orifice contained in said outer housing that forms a first pickup port wherein a first end of said orifice extends outward to the outer surface of said outer housing, and a second end of said orifice extends down to a higher permeable inner housing proximate to said turbine rotor; and a first pickup coil that is mounted within said first pickup port and excited by a signal received through said inner housing from said turbine rotor as said turbine rotor rotates;

said first pickup coil generates a signal indicative of the amount of vapors passing through said turbine meter.

25. The vapor recovery system of claim 24, wherein said turbine meter further comprises a second turbine rotor mounted on said shaft that rotates oppositely from said turbine rotor.

26. The vapor recovery system of claim 24, wherein said turbine rotor contains a plurality of vanes that cause said turbine rotor to rotate when said material comes into contact with said plurality of vanes.

27. The vapor recovery system of claim 24, wherein said turbine meter further comprises:

a second orifice contained in said outer housing that forms a second pickup port wherein a first end of said second orifice extends outward to the outer surface of said outer housing, and said second end of said second orifice extends down to a higher permeable inner housing proximate to said turbine rotor; and a second pickup coil that is mounted within said second pickup port and excited by a signal received through said inner housing from said turbine rotor as said turbine rotor rotates.

28. The vapor recovery system of claim 24, wherein said inner housing is comprised of a plug that is substantially the same size in diameter as said orifice.

29. The vapor recovery system of claim 24, wherein said inner housing is comprised of a cylindrical-shaped material that is placed in between said shaft and said outer housing.

30. The vapor recovery system of claim 24, wherein said signal indicative of the amount of vapor passing through said turbine meter is communicated to a site controller.

31. The vapor recovery system of claim 24, wherein said control system divides the amount of vapor by the amount of fuel dispensed by said fuel dispenser to determine a vapor-to-liquid (V/L) ratio.

32. The vapor recovery system of claim 31, wherein said control system adjusts said vapor recovery system in order to maintain a desired V/L ratio.

33. A method of measuring the flow rate of a material, comprising the steps of:

passing a material through an inlet port of an inner housing comprised of a high permeable material;

rotating a turbine rotor mounted inside said inner housing as said materials passes through said inner housing;

receiving a signal from a first pickup coil mounted on said inner housing proximate to said turbine rotor and within a first pickup port in an outer housing of a low permeable material formed around said inner housing to detect rotation of said turbine rotor; and correlating the rotation of said turbine rotor into a flow rate of said material.

34. The method of claim 33, further comprising the steps of:

receiving a second signal from a second pickup coil offset from said first pickup coil and mounted on said inner housing proximate to said turbine rotor and within a second pickup port in said outer housing to detect rotation of said turbine rotor; and determining the direction of rotation of said turbine meter based on said signal and said second signal.

35. A method of manufacturing a turbine flow meter, comprising the steps of:

forming an outer housing constructed of a low permeable material;

placing a turbine rotor on a shaft;

placing said shaft inside said outer housing on an axis in parallel with said outer housing;

placing an orifice in said outer housing that forms a first pickup port wherein a first end of said orifice extends outward to the outer surface of said outer housing, and said second end of said orifice extends down to a higher permeable inner housing placed proximate to said turbine rotor; and placing said first pickup port in said outer housing proximate to the location of said turbine rotor that runs down to the outer surface of said inner housing.

* * * * *